United States Patent
Heifets et al.

(10) Patent No.: US 9,600,454 B2
(45) Date of Patent: Mar. 21, 2017

(54) METHOD AND SYSTEM FOR EFFECTIVE SCHEMA GENERATION VIA PROGRAMMATIC ANALYSYS

(75) Inventors: Abraham Heifets, Cambridge, MA (US); Joseph J. Kesselman, Malden, MA (US); Eric David Perkins, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 792 days.

(21) Appl. No.: 13/543,407

(22) Filed: Jul. 6, 2012

(65) Prior Publication Data

US 2012/0297289 A1   Nov. 22, 2012

Related U.S. Application Data

(63) Continuation of application No. 11/745,028, filed on May 7, 2007, now Pat. No. 8,276,064.

(51) Int. Cl.
*G06F 17/00* (2006.01)
*G06F 17/22* (2006.01)
*G06F 17/27* (2006.01)

(52) U.S. Cl.
CPC ........ *G06F 17/2247* (2013.01); *G06F 17/227* (2013.01); *G06F 17/272* (2013.01)

(58) Field of Classification Search
CPC ... G06F 17/272; G06F 17/227; G06F 17/2247
USPC .................................. 715/234, 237; 717/143
See application file for complete search history.

(56) References Cited

U.S. PATENT DOCUMENTS

| | | |
|---|---|---|
| 5,557,722 A | 9/1996 | DeRose et al. |
| 6,654,734 B1 | 11/2003 | Mani et al. |
| 6,694,053 B1 * | 2/2004 | Burns et al. ................. 382/176 |
| 6,718,371 B1 * | 4/2004 | Lowry et al. ................. 709/213 |
| 6,950,866 B1 | 9/2005 | Lowry et al. |
| 7,647,303 B2 | 1/2010 | Kudo |
| 2001/0056504 A1 | 12/2001 | Kuznetsov |
| 2002/0107825 A1 | 8/2002 | Manicke et al. |
| 2004/0117769 A1 | 6/2004 | Lauzon et al. |
| 2004/0172599 A1 | 9/2004 | Calahan |
| 2005/0021548 A1 | 1/2005 | Bohannon et al. |
| 2005/0028099 A1 | 2/2005 | Harrington et al. |
| 2005/0060643 A1 | 3/2005 | Glass et al. |
| 2005/0177578 A1 | 8/2005 | Chen et al. |
| 2005/0273772 A1 * | 12/2005 | Matsakis et al. ............. 717/136 |
| 2006/0048107 A1 | 3/2006 | Thiagarajan et al. |
| 2006/0100989 A1 | 5/2006 | Chinchwadkar et al. |
| 2006/0265646 A1 | 11/2006 | Girolami Rose |
| 2006/0271835 A1 | 11/2006 | Marcy et al. |
| 2006/0288028 A1 | 12/2006 | Waldvogel et al. |
| 2007/0150829 A1 | 6/2007 | Eschbach et al. |
| 2007/0168916 A1 | 7/2007 | Dahlin et al. |
| 2007/0245330 A1 | 10/2007 | Lapounov et al. |

* cited by examiner

*Primary Examiner* — Stephen Hong
*Assistant Examiner* — Marshon Robinson
(74) *Attorney, Agent, or Firm* — Charles L. Moore; Moore & Van Allen PLLC

(57) ABSTRACT

A method to generate an effective schema of an electronic document for optimizing the processing thereof may include performing a programmatic analysis to determine all required portions of the electronic document. The method may also include generating a parser or deserializer to build an optimized document model; and specializing a document processing program against the optimized document model.

17 Claims, 7 Drawing Sheets

METHOD AND SYSTEM FOR EFFECTIVE SCHEMA GENERATION VIA PROGRAMMATIC ANALYSYS

The present application is a continuation of prior U.S. patent application Ser. No. 11/745,028, filed May 7, 2007 and is incorporated herein in its entirety by reference.

BACKGROUND OF THE INVENTION

The present invention relates to optimizing processing of electronic documents, such as Extensible Markup Language (XML) documents or similar electronic documents, and more particularly to a method and system for effective schema generation via programmatic analysis for optimizing the processing of electronic documents.

Optimization of processing electronic documents, such as XML documents, can have a dramatic impact on runtime efficiency and reduce memory requirements as well as other benefits. Known XML optimization techniques, such as efficient parser generation, XML shredding, and input-specialization require a description of the expected XML documents in the form of an XML Schema or the equivalent. From this input description or schema, specialized code or data representations may be generated that are specifically optimized for the particular class of XML input documents. However, in practice, XML Schema or input descriptions are often unavailable to perform such optimizations, inapplicable, or they may not exist at all. Some input documents may be merely well-formed and not required to be valid instances of specific schemas. Processing a document may be desired even though a faulty instance of the documents nominal schema is all that is available.

BRIEF SUMMARY OF THE INVENTION

In accordance with an embodiment of the present invention, a method to generate an effective schema of an electronic document for optimizing the processing thereof may include performing a programmatic analysis to determine all required portions of the electronic document. The method may also include generating an optimized document model; and specializing a document processing program against the optimized document model.

In accordance with another embodiment of the present invention, a system to generate an effective schema of an electronic document for optimizing the processing thereof may include a programmatic analyzer to determine all required portions of the electronic document. The system may also include a parser to build up an indexed document tree including a plurality of nodes, each corresponding to a required portion of the electronic document. The system may further include an input specialization transform module to optimize a document processing program against an optimized document model from the parser.

In accordance with another embodiment of the present invention, a computer program product to generate an effective schema of an electronic document for optimizing the processing thereof may include a computer usable medium having computer usable program code embodied therein. The computer usable medium may include computer usable program code configured to perform a programmatic analysis to determine all required portions of the electronic document. The computer usable medium may also include computer usable program code configured to generate an optimized document model. The computer useable medium may also include computer usable program code configured to specialize a document processing program against the optimized document model.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1:
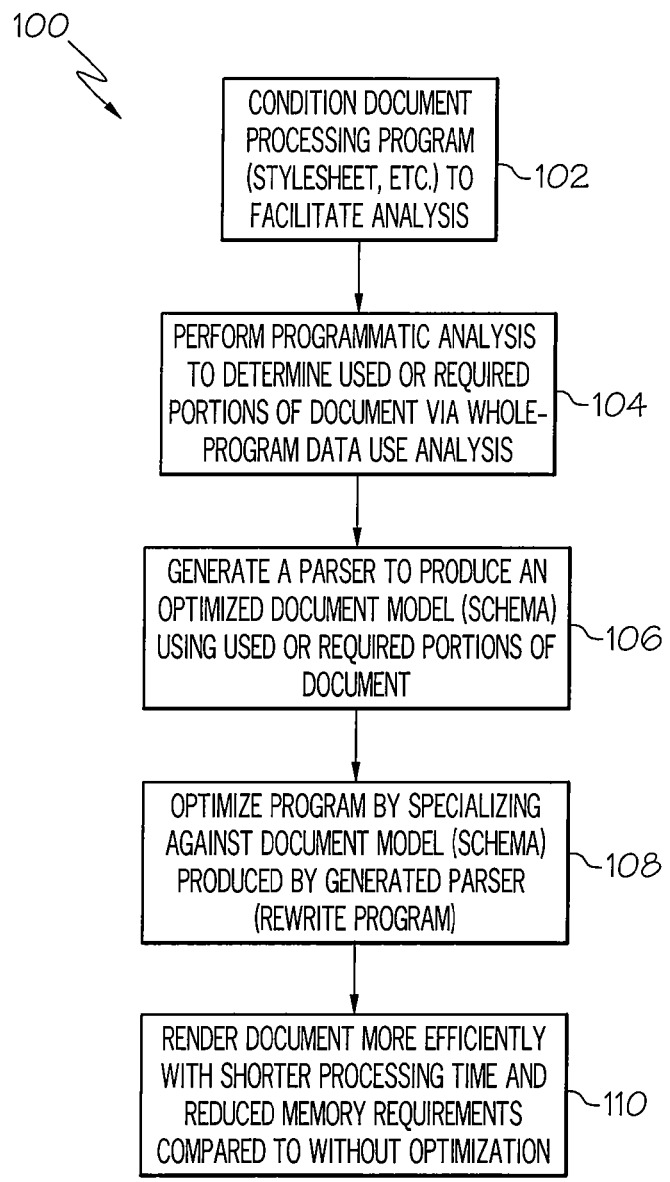
FIG. 1 is a flow chart of an exemplary method for effective schema generation via programmatic analysis to optimize the processing of a document in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium, such as for example medium 532 in FIG. 5, having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages, or in functional programming languages, such as Haskell, Standard Meta Language (SML) or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a flow chart of an exemplary method 100 for effective schema generation via programmatic analysis to optimize the processing of a document in accordance with an embodiment of the present invention. The document processing program may be an Extensible Stylesheet Language (XSL) stylesheet, an Extensible Query Language (XQuery) expression, or similar document processing program in an electronic or coded form. The input document may be an XML document or a similar document in an electronic or coded form. In block or module 102, the document processing program may be conditioned, formed or modified to facilitate analysis. An example of a method for conditioning, forming or modifying a document processing program will be described with reference to FIG. 2.

In block or module 104, programmatic analysis may be performed on the document processing program or stylesheet to determine all potentially used or required portions of the input document in carrying out a particular processing or rendering of the input document. The potentially used or required portions of the input document imply an "effective schema" or "use-based" schema. The programmatic analysis to determine required portions of the input document may involve a whole-program data use analysis. An example of method to perform programmatic analysis will be described in detail with reference to FIG. 3.

In block or module 106, a parser may be generated to produce an optimized document model from the used or required portions of the document. The optimized document model may discard document contents determined not to be relevant to the task at hand, or may represent the relevant portions in a form which is better suited to the expected queries, such as precomputed selection groups or an indexed document tree. An example of a method for generating a parser or producing an optimized document model will be described with reference to FIG. 4.

In block or module 108, a document processing program may be optimized by specializing against a specific document model produced by the parser in block 106. An example of a specialization process is described in U.S. patent application Ser. No. 11/501,216, filed Aug. 7, 2006, entitled "Method and Apparatus for Input Specialization" by Dennis A. Quan et al., which is assigned to the same assignee as the present invention and incorporated herein in its entirety by reference. Specializing a document processing program against a specific document model may involve simplifying the document processing program thereby reducing the number operations. For example, the document model may include elements, such as unused data members and/or attributes, that may not be used in a particular application. Operations associated with these unused data members and/or attributes may be removed. Additionally, as described herein, any reverse path use may be removed from the document processing program. Accordingly, the program structure may be unidirectionally linked only in a child node direction. Ancestor references to data elements may therefore be identified and stored for future references to ancestor or parent nodes. Other examples of optimizing the document processing program by simplifying or specializing against the document model are described in U.S. patent application Ser. No. 11/501,216.

In block or module 110, the document may be processed, rendered or the like more efficiently with shorter processing time, reduced memory requirements and other possible benefits compared to processing or rendering without optimization.

Figure 2:
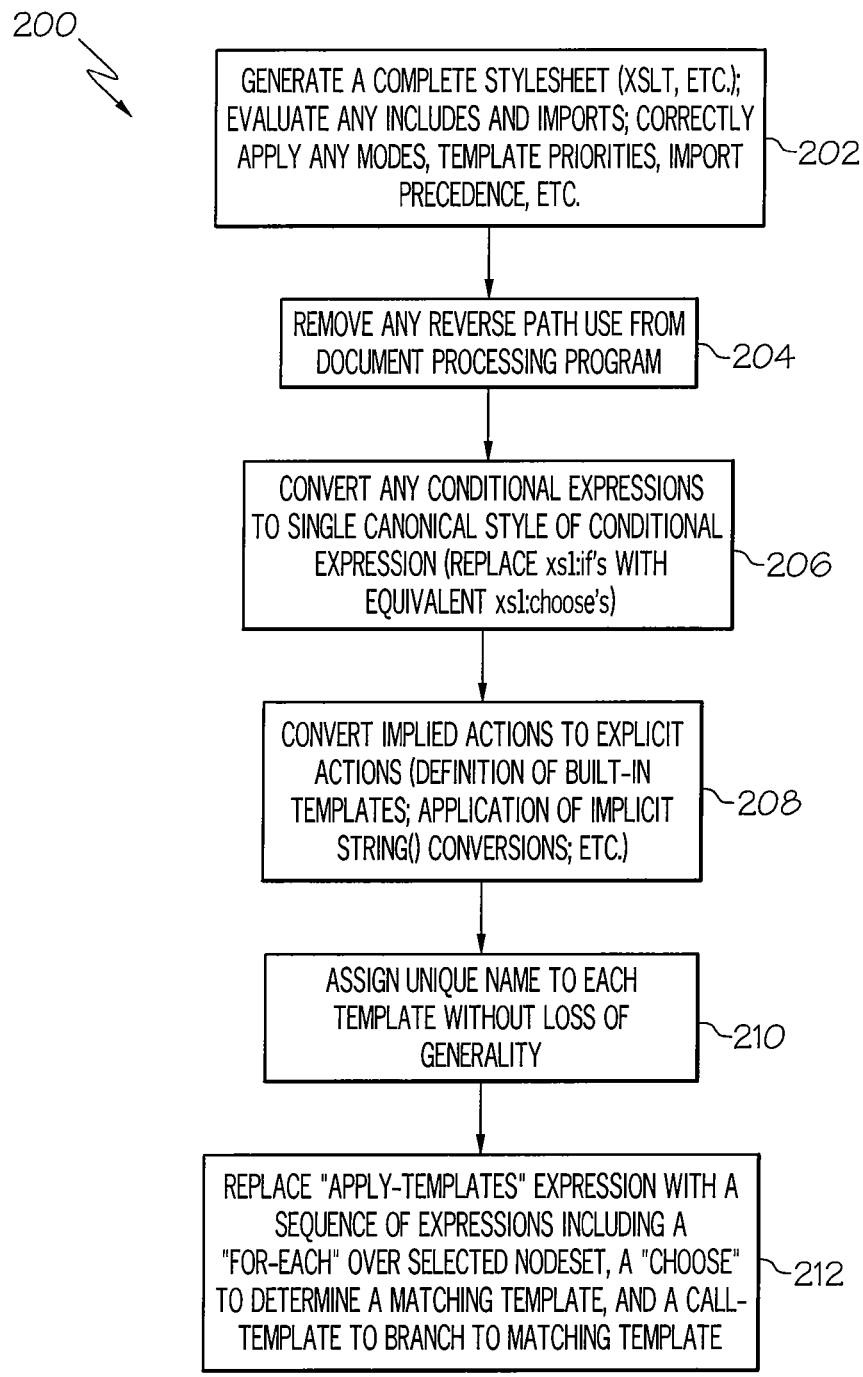
FIG. 2 is a flow chart of an example of a method for conditioning, forming or modifying a document processing program for performing programmatic analysis in accordance with an embodiment of the present invention.

FIG. 2 is a flow chart of an example of a method 200 for conditioning a document processing program for performing programmatic analysis in accordance with an embodiment of the present invention. As previously discussed, the electronic document processing program may be an XSLT program or other document in an electronic or coded format. The method 200 may be used for the block or module 102 in the method 100 of FIG. 1.

In block or module 202, a complete stylesheet or the like may be generated. The stylesheet may be an Extensible Stylesheet Language Transformation (XSLT) or other type stylesheet. The complete stylesheet may be generated by evaluating any includes and imports, correctly applying modes, template priorities, and import precedence, as defined in the XSLT specification. These are techniques provided by the XSLT specification to ease programmer burden by allowing a programmer to compose a complete stylesheet from a set of programmatic building blocks, similar to common well-known tools such as compiler directives, macro systems, or the C++ template system. As with these systems, the resulting program is straightforward to determine statically at compile time.

Figure 6:
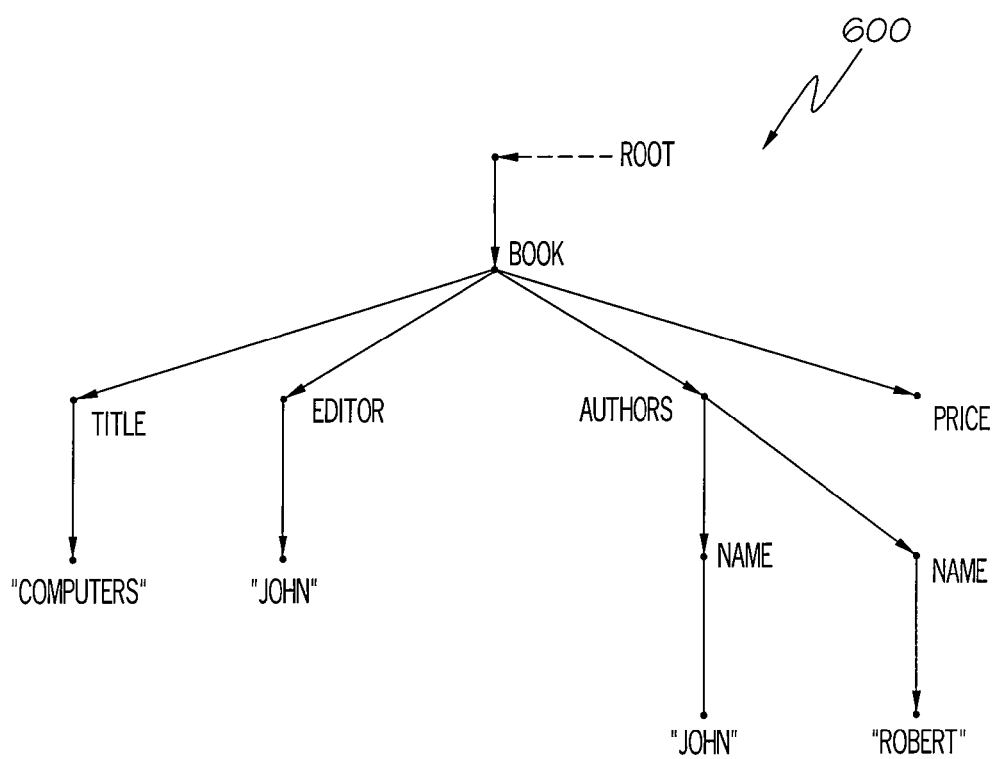
FIG. 6 is an example of a tree that represents an exemplary XML documents.

In block or module 204, any reverse path use may be removed from the document processing program or XML processing program. An example of a technique for removing the reverse path is described in "XPath: Looking Forward" by Dan Oltenau et al., Proc. of the EDBT Workshop on XML Data Management (XMLDM), 2002, Springer LNCS vol. 2490, pg 108-127. The technique basically involves replacing XPath expressions with reverse paths by equivalent expressions without reverse paths, or transforming absolute XPath location paths with reverse axes into equivalent reverse-axis-free location paths. XPath is an XML language for addressing items in a XML document by specifying a path through the document structure. XPath is used by XPointer, XQuery, and XSLT to locate and identify data in an XML document. The document structure may be defined as a tree including a plurality of nodes which may be related or linked together in a hierarchy, such as an ancestor node, child node, descendant node, preceding node or the like. The nodes can represent data elements including attributes and associated values or other data in the document. Replacing expressions with reverse paths with equivalent expressions without reverse path can simplify the document processing making it more efficient by reducing the number of computations and taking less memory. FIG. 6 is an example of a tree 600 that represents the following XML data:

```
<book>
    <title>computers</title>
    <editor>john</editor>
    <authors>
        <name>john</name>
        <name>Robert</name>
    </authors>
    <price />
<book>
```

In block 206, any conditional expressions may be converted to a single canonical style of conditional expression. For example, xsl:if's may be replaced with equivalent xsl: choose's. In block or module 208, any implied actions may be converted to explicit actions. For example the definition of built-in templates, the implicit selection of the children nodes of the context node in xsl:apply-templates calls lacking a select, or the application of implicit string ( ) conversions may be made explicit. These conversions are similar to the "desugaring" performed by compilers of more traditional languages.

In block or module 210, a unique name may be assigned to each template. In block or module 212, any apply-templates expression may be replaced with a sequence of expressions including a "for-each" over a selected node set, a choose to determine a matching template, and a call-template to branch to the matching template.

Figure 3A:
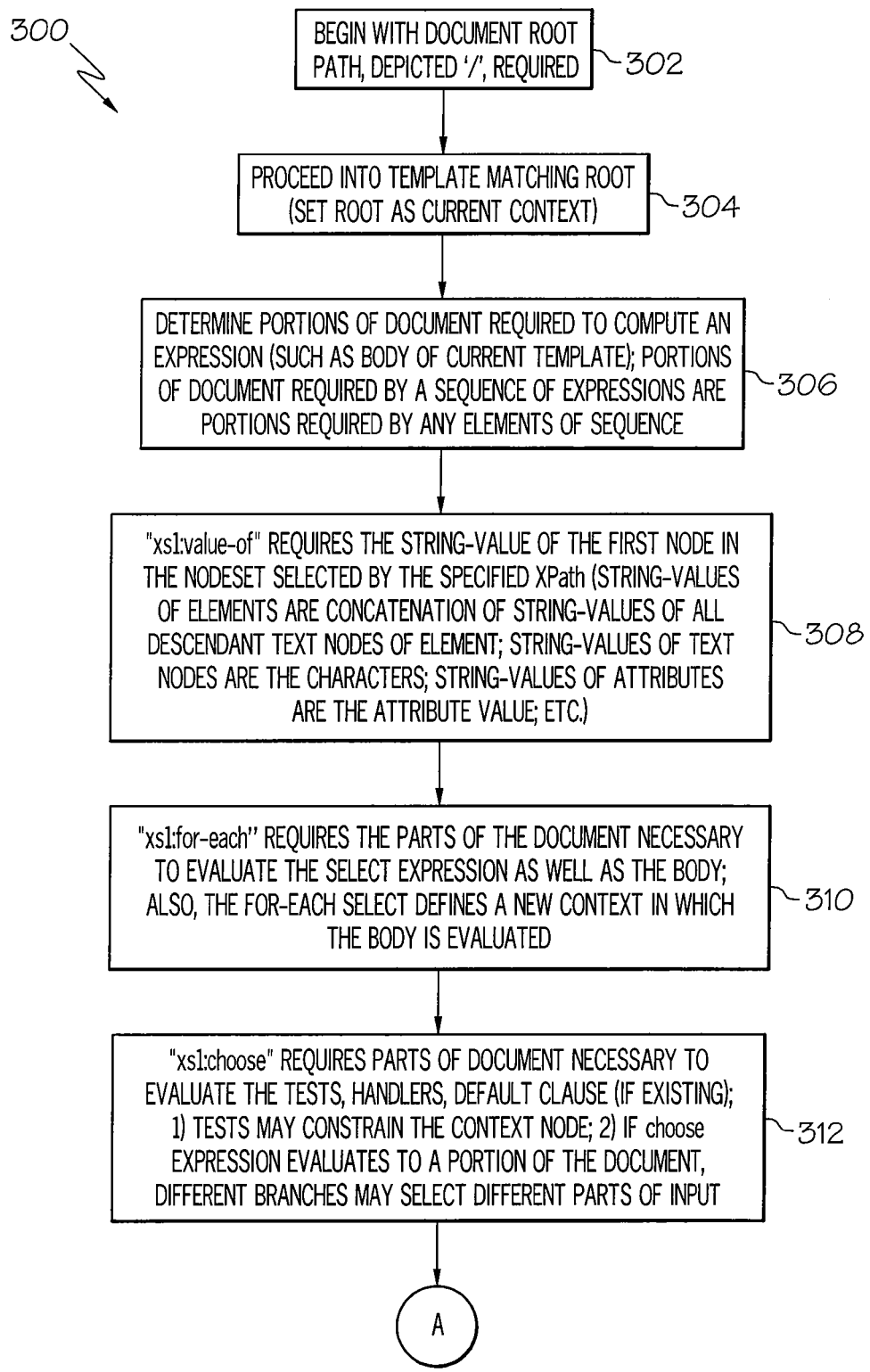
FIGS. 3A and 3B (collectively FIG. 3) are an example of a method for performing programmatic analysis to optimize the processing of a document in accordance with an embodiment of the present invention.
Figure 3B:
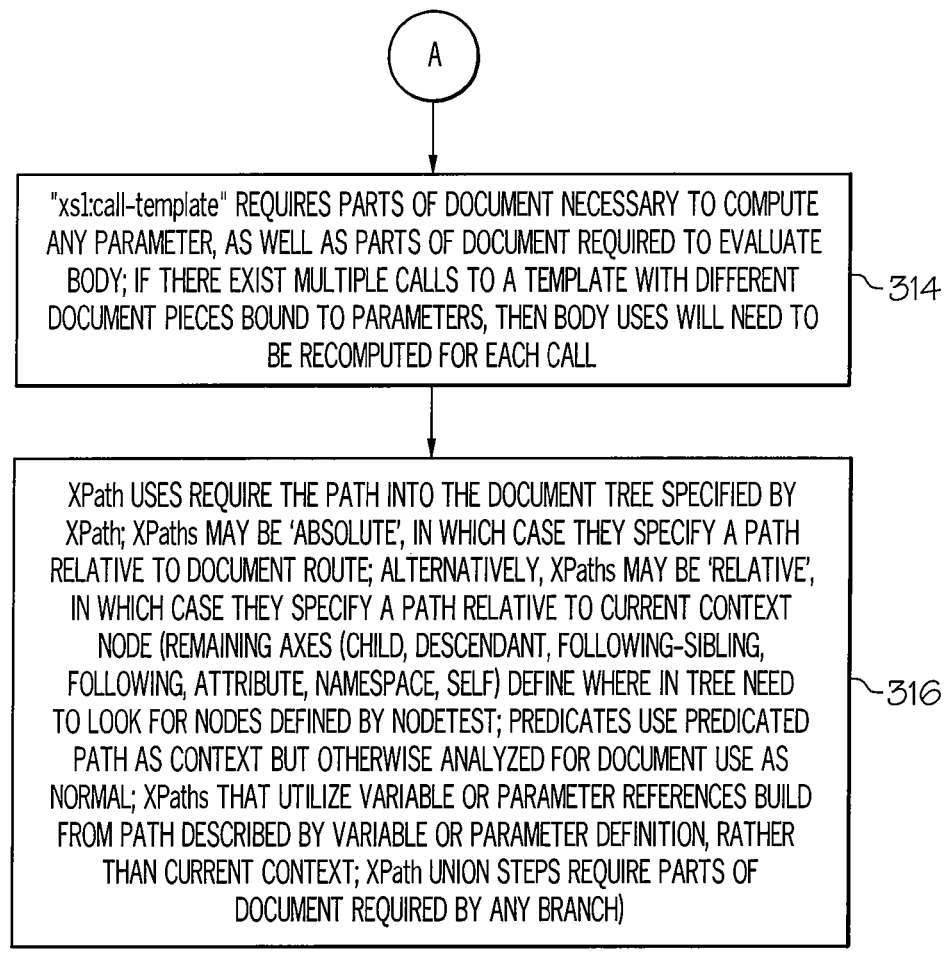

FIGS. 3A and 3B (collectively FIG. 3) are an example of a method 300 for performing programmatic analysis to optimize processing of a document in accordance with an embodiment of the present invention. The method 300 may be used for block or module 104 in method 100 of FIG. 1. In block or module 302, the process may begin with the document root path which may be depicted by the operator '/'. In block 304, the method 300 may proceed into the template matching root. The root may be set as the current context.

In block or module 306, portions or parts of the input document required to compute an expression, such as the body of the current template, may be determined. The following blocks or modules describe examples of portions or parts of the document that may be required. Also expressed in block 306, portions of the document required by a sequence of expressions are portions or parts or the document required by any element of the sequence.

In block or module 306, an "xsl:value-of" expression requires the string-value of the first node in a node set selected by a specified XPath. String-values of elements are a concatenation of the string-values of all descendant text nodes of the element. String-values of text nodes are the characters. String-values of attributes are the attribute value, and so on as defined in the XSL specification.

In block or module 310, an "xsl:for-each" expression requires the parts of the document necessary to evaluate the select expression of the xsl:for-each as well as the body of the xsl:for-each. Also, the xsl:for-each select defines a new context in which the xsl:for-each body is evaluated.

In block or module 312, an "xsl:choose" expression requires the parts of the document necessary to evaluate the tests, the handlers, and the default clause (if it exists). The tests may constrain a context node. For example, in the idiom of replacing any apply-template expressions as previously described with reference to block 212 in FIG. 2, the QName of the context node is tested to determine which template to call. Regardless of the specificity of the information about the context, it can be statically determined that, if the program performs a call into the matched template, the context QName must have matched the test.

If an xsl:choose expression evaluates to a portion of the document, different branches may select different parts of the input. In such a case, further uses of the choose value will need to calculate document use requirements from each possible choose return value. For example, if the choose selectively uses Foo or Bar nodes, and then the Baz children of those nodes are selected, Foo/Baz and Bar/Baz nodes will need to be stored from the input document.

In block or module 314, an "xsl:call-template" expression requires the parts of the document necessary to compute any parameter, as well as the parts of the document required to evaluate the body of the template. If there exist multiple calls to a template with different document pieces bound to the parameters, then the template body uses will need to be recomputed for each call. If an xsl:call-template expression is recursive or mutually recursive, the document use definitions will be recursive as well (as with standard recursive data-type definitions).

In block or module 316, uses of XPath require the path into the document tree specified by the XPath. XPaths may be 'absolute', in which case they specify a path relative to the document root. Alternatively, XPaths may be 'relative', in which case they specify a path relative to the current context node.

The remaining axes of the document tree (child, descendant, following-sibling, following, attribute, namespace, self) of the XPath define where in the tree to look for the nodes defined by the node test. The child axis constrains the node test to only be appropriate to the immediate content of the current node in the tree. Descendants require the nodes selected by the node test at all levels below the current node. Following-sibling constrains the test to the context of the parent of the current node. Following means an interest in any node following in document order, which means (in the absence of ordering information) at any node handler of the tree. Attribute, namespace, and self are relative to the current node.

The node test constrains which document nodes are of interest. From Section 2.3 of the XPath specification, Version 1.0 W3C recommendation 16 Nov. 1999: "A node test that is a QName is true if and only if the type of the node is the principal node type and has an expanded-name equal to the expanded-name specified by the QName. For example, child::para selects the para element children of the context node; if the context node has no para children, it will select an empty set of nodes. attribute::href selects the href attribute of the context node; if the context node has no href attribute, it will select an empty set of nodes."

Also in block or module 316, predicates may use the predicated path as the context but otherwise may be analyzed for document use as normal. XPaths that utilize variable or parameter references build from the path described by the variable or parameter definition, rather than the current context. XPath union steps require the parts of the document required by any branch.

Figure 4:
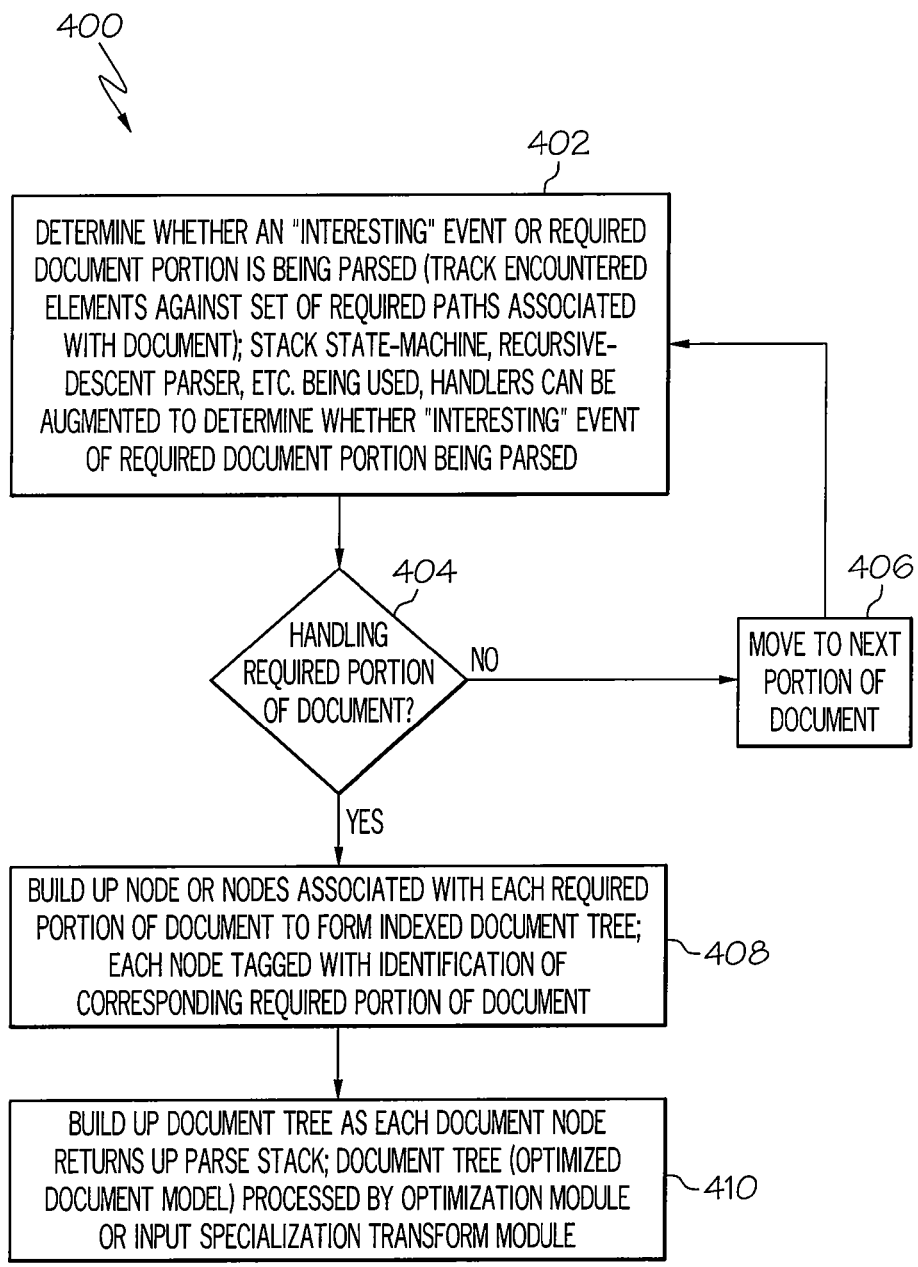
FIG. 4 is a flow chart of an example of a method for producing an optimized document model or indexed document tree in accordance with an embodiment of the present invention.

FIG. 4 is a flow chart of an example of a method 400 for producing an optimized document model or indexed document tree in accordance with an embodiment of the present invention. The method 400 may be used to perform the function in block 106 of FIG. 1. In block or module 402, a determination may be made as to whether a required document portion is being parsed. The determination may be made by tracking encountered elements against a set of required paths associated with the document. As will be clear to one skilled in the art, the set of (possibly recursively defined) required document parts may be used as a grammar definition for the creation of a parser or deserializer. If the parser is a stack-based state machine, a recursive descent parser or similar parser, the event handlers may be augmented to track whether a required document portion is being parsed. For example, if the previous analysis examines the expression <xsl:value-of select="/Foo/@Bar"/> and determines that the characters comprising the value of an attribute named Bar of the element named Foo which, in turn, is a child of the document root, are required to evaluate the xsl:value-of expression, a parser may be generated which tracks when a Foo child element of the document root is encountered. Further, the generated parser may note whether the Foo element had a Bar attribute and, if so, store the characters comprising the value of the Bar attribute.

In block 404, a determination may be made if a required portion of the document is being handled by using the output of the previous analysis as a filter on the input. If a portion of the input document is not required, the method 400 may advance to block 406 and a next portion of the document may be considered. If a required portion of the document is being handled, the method 400 may advance to block 408. In block 408, a node or nodes associated with each required portion of the document may be built up to form an indexed document tree. Each node may be tagged with an identification of the corresponding required portion of the document.

In block 410, a document tree may be built up as each document node is returned up the parse stack. The document tree or optimized document model may then be processed by an optimization module or input specialization transform module similar to that previously described with reference to block or module 108 in FIG. 1.

Figure 5:
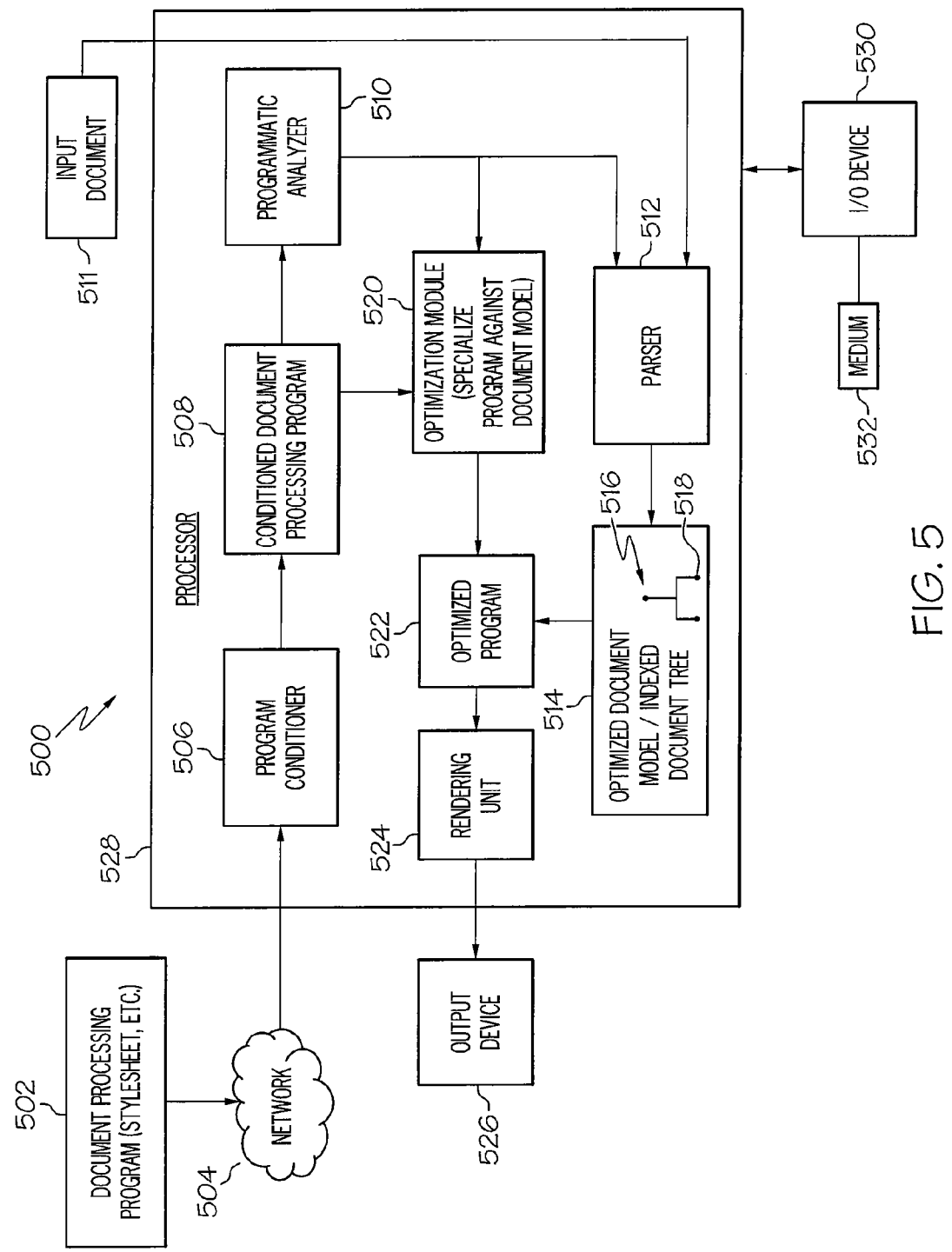
FIG. 5 is a block diagram of an example of a system for effective schema generation via programmatic analysis to optimize the processing of a document in accordance with an embodiment of the present invention.

FIG. 5 is a block diagram of an example of a system 500 for effective schema generation via programmatic analysis to optimize processing of an input document in accordance with an embodiment of the present invention. The methods 100, 200, 300 and 400 may be embodied in and/or performed by the system 500. A document processing program 502 or XML program, such as an XSL stylesheet or similar program may be received via a network 504 or via some other means. A program conditioner 506 may receive the document processing program 502 and produce a conditioned program 508. The program conditioner 506 may perform operations similar to those described with respect to the method 200 in FIG. 2.

A programmatic analyzer 510 may receive the conditioned program 508. The programmatic analyzer 510 may determine all required or used portions of an input document 511. The programmatic analyzer 510 may perform operations similar to those described with respect to the method 300 in FIG. 3.

A parser 512 may be associated with the programmatic analyzer 510 and may be generated by the programmatic analyzer 510 to build up an optimized document model 514 or indexed document tree 516 including a plurality of nodes 518. Each node 518 may correspond to a portion of the input document 511 which is used or required by the document processing program 502. The parser 512 may perform operations similar to those described with respect to the method 400 of FIG. 4.

An optimization module 520 or input specialization transform module may be associated with the programmatic analyzer 510 and may optimize the conditioned document processing program 508 to generate an optimized document processing program 522 which may run against the optimized document model 514 from the parser 512. The optimization module 520 may perform similar operations to those described with respect to block or module 108.

A rendering unit 524 or other processing unit may be provided to render or present the document on an output device 526. The output device 526 may be a display, printer, disk drive or other output device.

The program conditioner 506, programmatic analyzer 510, parser 512, optimization module 520, and rendering unit 524 may be operable on a processor 528. Input devices, other output devices or combination input/output devices 530 may be associated with the processor 528 to permit a user to control, update and maintain the processor 528 and associated components. For example, a computer program product embodied in a medium 532, similar to that previously described, may be used to transfer computer useable program code to the processor 528. The computer useable program code may embody the methods 100, 200, 300 and 400.

Accordingly, the present invention permits applying optimizations achievable by schema-driven specialization, but requires no additional input beyond the document processing program, XML accessing program or similar program to be executed. In accordance with an embodiment of the present invention, a method, such as method 300, is provided for analyzing how a program will access its input, and using that analysis as an "effective lax schema" to optimize the representation of the input for that access and rewrite the program to use the optimized data representation. The analysis provides a compact data model by eliding intermediate nodes, going directly to interesting nodes or nodes that are required or used, node sets, or values. Use-tuned parsers, data models, and accessor functions can then be generated to improve performance.

The embodiments of the present invention do not require a schema, and in fact the subset of the input data necessary to produce correct output may be smaller than what an input schema for a specific program may permit, allowing better optimization. Note, however, that the two approaches are not necessarily mutually exclusive; if an input schema is also available, information from it (schema-driven specialization as previously disclosed) could be combined with the present invention (usage-driven specialization) to derive further constraints, and potentially yield results better than either alone.

As an example of operation of the exemplary embodiments of the present invention previously described, consider the following XSLT program:

```
<xsl: template match ="/">
    <xsl: for-each select ="A/B">
        <xsl: value-of select ="C"/>
        <xsl: value-of select ="D" />
    </xsl: for-each>
</xsl: template>
```

This program checks the root element of the input document. If it is an 'A' element, then it walks over each B child, copying first its C children and then its D children. The goal is to optimize the document representation so that the program's use of the input is efficient. The first step is to determine what parts of the input the program uses. The process begins at the program's use of the root node of the document and proceeds with a whole program analysis of node use. For example, the A nodes are requested from the document root. From A nodes, the B nodes are requested. From the B nodes, the C and D nodes are requested. To evaluate the xsl:value-of expression, the string-value of the first C and D nodes (in other words, the concatenation of the characters contained in the C and D nodes, as required by the XPath specification) is needed.

For XPath and XSLT, the set of inputs is easily computable and succinctly representable. For iteration over (possibly constrained) children, such as in the xsl:for-each, an ordered set corresponding to the children is required. To evaluate existence predicates (FOO[BAR]), the existence of the nodes tested merely needs to be recorded. For output requiring the evaluation of the value of a node, including conditional tests based on node value, the characters comprising the string-value of the node can be recorded, as described in the specification of the XPath string( ) function. Such a set of node usages describes which typed getters are necessary and sufficient to evaluate the program.

To ensure that an appropriate data representation is built for the getters to access, a specialized parser and deserializer (data-model instantiator) may be generated from the use description. In other words, if the use description indicates that, to process a B node, the C children and D children are each processed separately, the parser-deserializer may build a specialized B representation containing separate sets of C and D children on encountering a B in the input document (rather than the generic Node that an unspecialized parser-deserializer would build). When the program running against this specialized representation requires the C children, it no longer needs to examine each child node in turn to determine if it is a C; rather the set has been labeled during construction of the optimized document model. Another source of efficiency in the system is that, if an input is encountered that the program does not require, the parser can skip it; the parser does not need to spend time or memory creating a representation. The output of this specialized parser is precisely what is needed by the specialized, efficient program. Note that this pairing of specialized parser to specialized program requires the parser to be generated as well as the program. This implies the generation of a new, different, separate, specialized, optimized parser for each program. While this makes the compiler's logic more complex, it is no more onerous to use than a normal XSLT compiler.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method to generate an effective schema of an electronic document for optimizing the processing thereof, comprising:
    performing a programmatic analysis on a document processing program, by a processor, to determine required portions of the electronic document for rendering the electronic document;
    generating a parser that generates the optimized document model based on the required portions of the electronic document;
    generating the optimized document model;
    optimizing the document processing program by specializing the document processing program against the optimized document model, wherein an operation of the document processing program that is associated with an unused member of the optimized document model is removed from the document processing program; and
    rendering the electronic document using the optimized document processing program with a shorter processing time and a reduced memory requirement than without optimization.

2. The method of claim 1, further comprising determining if one of the required portions of the electronic document is being handled by tracking an encountered element against a set of required paths.

3. The method of claim 2, further comprising building up a plurality of nodes corresponding to each of the required portions of the document, each node being tagged to its corresponding required portions of the document.

4. The method of claim 3, further comprising:
    building up an indexed document tree as the plurality of nodes returned up a parse stack; and
    using the required portions of the document as determined by the programmatic analysis as an input to an input specialization transformation module for optimizing the document processing program.

5. The method of claim 1, further comprising conditioning the document processing program to facilitate programmatic analysis.

6. The method of claim 5, wherein conditioning the document processing program to facilitate programmatic analysis comprises:
    generating a complete stylesheet;
    removing any reverse path use from the processing program;
    desugaring alternative equivalent expressions to one canonical form;
    converting implied actions to explicit actions; and
    assigning a unique identification to each template.

7. The method of claim 6, wherein generating the complete stylesheet comprises:
    evaluating all includes and imports; and
    applying all modes, template priorities and import precedences.

8. The method of claim 1, wherein the performing programmatic analysis comprises:
    beginning at a document root path;
    proceeding into a template matching a root corresponding to the document root path;
    setting a current context as the root; and
    determining portions of the document required to compute an expression.

9. The method of claim 8, wherein determining portions of the document required to compute an expression comprises:
    identifying an xsl:value-of expression as requiring a string-value of a first node in a node set selected by a specified path through the document;
    identifying an xsl:for-each expression as requiring portions of the document necessary to evaluate a select expression of the xsl:for-each expression as well as a body of the xsl:for-each expression;
    identifying an xsl:choose expression as requiring portions of the document necessary to evaluate any tests, handlers and default clause;
    identifying an xsl:call-template expression as requiring all portions of the document necessary to evaluate any parameter and to evaluate a body of the called template determined by the xsl:call-template expression, wherein template body uses are recomputed for each template call in response to multiple calls to a template in the document with different document portions being bound to parameters, and wherein document use of a definition will be recursive in response to the xsl:call-template being one of recursive and mutually recursive; and
    requiring a path into a document tree specified by a path expression.

10. The method of claim 1, wherein performing a programmatic analysis to determine required portions of the electronic document comprises determining used portions of the document via a whole-program data use analysis.

11. A system to generate an effective schema of an electronic document for optimizing the processing thereof, comprising:
    a programmatic analyzer that performs a programmatic analysis on a document processing program to determine required portions of the electronic document;
    a parser to build up an optimized document model or indexed document tree including a plurality of nodes each corresponding to one of the required portions of the electronic document; and
    an optimization module that optimizes the document processing program by specializing the document processing program against the optimized document model from the parser, wherein an operation of the document processing program that is associated with an unused member of the optimized document model is removed from the document processing program; and
    a rendering unit for rendering the electronic document using the optimized document processing program with a shorter processing time and a reduced memory requirement than without optimization.

12. The system of claim 11, further comprising a document conditioner to condition the document processing program to facilitate programmatic analysis.

13. The system of claim 11, wherein the programmatic analyzer comprises:
    means for identifying a document root path to begin analysis;
    means for proceeding into a template matching a root corresponding to the document root path;
    means for setting a current context as the root; and
    means for determining portions of the document required to compute an expression.

14. The system of claim 13, further comprising:
  means for identifying any xsl:value-of expression as requiring a string-value of a first node in a node set selected by a specified path through the document;
  means for identifying an xsl:for-each expression as requiring portions of the document necessary to evaluate a select expression of the xsl:for-each expression as well as an xsl:for-each body;
  means for identifying an xsl:choose expression as requiring portions of the document necessary to evaluate any tests, handlers and default clause;
  means for identifying an xsl:call-template as requiring portions of the document necessary to determine any parameter and to evaluate a body of a called template determined by the xsl:call-template expression, wherein template body uses are recomputed for each template call in response to multiple calls to a template in the document with different document portions being bound to the parameters, and wherein document use of a definition will be recursive in response to the xsl:call-template being one of recursive and mutually recursive; and
  means for determining a path into a document tree specified by the specified path.

15. A computer program product to generate an effective schema of an electronic document for optimizing the processing thereof, the computer program product comprising:
  a non-transitory computer usable storage medium having computer usable program code embodied therein, the computer usable medium comprising:
    computer usable program code configured to perform a programmatic analysis on a document processing program to determine required portions of the electronic document;
    computer useable program code configured to generate a parser that generates the optimized document model based on the required portions of the electronic document;
    computer usable program code configured to generate the optimized document model; and
    computer usable program code configured to optimize the document processing program by specializing the document processing program against the optimized document model, wherein an operation of the document processing program that is associated with an unused member of the optimized document model is removed from the document processing program; and
    computer useable program code configured to render the electronic document using the optimized document processing program with a shorter processing time and a reduced memory requirement than without optimization.

16. The computer program product of claim 15, wherein the computer usable medium further comprises computer usable program code configured to build up a plurality of nodes corresponding to each of the required portions of the document to form an indexed document tree, each node being tagged to its corresponding one of the required portions of the document.

17. The computer program product of claim 15, wherein the computer usable medium further comprises computer usable program code configured to determine used portions of the document via a whole-program data use analysis.

* * * * *